United States Patent
Bancal

[19]

[11] Patent Number: 6,081,247
[45] Date of Patent: Jun. 27, 2000

[54] METHOD FOR REGENERATING MICROTIPS OF A FLAT DISPLAY SCREEN

[75] Inventor: Bernard Bancal, Luynes, France

[73] Assignee: Pixtech S.A., Rousset, France

[21] Appl. No.: 08/883,051

[22] Filed: Jun. 26, 1997

[30] Foreign Application Priority Data

Jul. 2, 1996 [FR] France .................................. 96 08487

[51] Int. Cl.[7] .................................................. G09G 3/22
[52] U.S. Cl. .......................... 345/75; 345/74; 315/169.3
[58] Field of Search .................................. 345/74, 60, 64, 345/75; 445/6; 315/169.1, 169.2, 169.3, 169.4; 313/309, 336, 351, 495, 497

[56] References Cited

U.S. PATENT DOCUMENTS

| | | | |
|---|---|---|---|
| 4,818,914 | 4/1989 | Brodie ........................................ | 345/74 |
| 5,262,698 | 11/1993 | Dunham ................................ | 315/169.1 |
| 5,554,828 | 9/1996 | Primm ..................................... | 345/173 |

OTHER PUBLICATIONS

*Microprocessor–aided Remolding of Field Emitters*, Journal of Physics E. Scientific Instruments, vol. 17, No. 9, pp. 782–787, Sep. 1984.

*Micromachined Field Emission Cathode with an Integrated Heater*, Journal of Vacuum Science and Technology, Part B, vol. 13, No. 6, pp. 2432–2435, Nov. 1, 1995.

*Primary Examiner*—Richard A. Hjerpe
*Assistant Examiner*—Anthony J. Blackman
*Attorney, Agent, or Firm*—Arthur L. Plevy

[57] ABSTRACT

The present invention relates to a method for regenerating microtips of a flat display screen including a cathode with electronic emission microtips associated with a grid for extracting electrons emitted by the microtips, wherein the microtips are made to emit under a current density which is substantially higher than a nominal operating current density and for a duration which is substantially higher than a nominal operating addressing duration.

9 Claims, 2 Drawing Sheets

METHOD FOR REGENERATING MICROTIPS OF A FLAT DISPLAY SCREEN

BACKGROUND OF THE INVENTION

1. Field of the Invention

The present invention relates to a flat microtip display screen.

2. Discussion of the Related Art

FIG. 1 partially shows, in cross-sectional view, the structure of a flat microtip display screen of the type to which the present invention relates.

Such a screen is essentially formed of a cathode 1 with microtips 2 and of a grid 3 having holes 4 at the locations of the microtips 2. Cathode 1 is placed facing a cathodoluminescent anode 5, a glass substrate 6 of which forms the screen surface.

The operating principle and the detail of the constitution of such a microtip screen are described in U.S. Pat. No. 4,940,916 of the Commissariat à l'Energie Atomique.

Cathode 1 is formed, on a glass substrate 7, of cathode conductors 8 organized in columns. These conductors 8 are generally coated with a resistive layer (not shown) for homogenizing the electronic emission. Cathode 1 is associated with grid 3, with a layer 9 being interposed to insulate the cathode conductors 8 from grid 3. The holes 4 are bored into grid layer 3 and insulating layer 9 for receiving the microtips 2 which are formed on the resistive layer. Grid 3 is organized in rows, the intersection of a row and of a column of the cathode defining a pixel.

This device uses the electric field created between cathode 1 and grid 3 for the extraction of electrons from the microtips 2 towards phosphor elements 10 of anode 5, the electrons crossing an empty space 11. Phosphor elements 10 are deposited on electrodes 12, formed of a transparent conductive layer such as indium and tin oxide (ITO).

In the case of a color screen, anode 5 is provided with alternate bands of phosphor elements 10, each corresponding to a color (Red, Green, Blue). Each band is electrically insulated from the two neighboring bands. The bands are arranged to be parallel to the cathode columns 8, a group of three bands (one per color) facing a cathode column. The sets of red, green, blue bands are selectively biased with respect to cathode 1, so that the electrons extracted from the microtips 2 of a pixel of the cathode/grid are selectively directed towards the phosphor elements 10 facing each of the colors.

In the case of a monochrome screen, the anode is generally comprised of a plane of phosphor elements or of two sets of alternate bands of the same color.

FIG. 2 partially shows an electronic emission microtip cathode associated with a grid for extracting the emitted electrons, to illustrate the addressing of the cathode and of the grid during the operation of a microtip screen. The anode (5, FIG. 1) and the insulating layer (9, FIG. 1) between cathode 1 and grid 3 have not been shown, for clarity. Similarly, only a few microtips 2 have been shown at the intersection of a row L of grid 3 and of a column K of cathode 1. In practice, there are several thousands of microtips per screen pixel.

The display of an image is performed during a frame period (for example 20 ms) by properly biasing the anode, cathode 1 and grid 3 by means of an electronic control circuit (not shown). For a color screen, the sets of bands of phosphor elements (10, FIG. 1) are sequentially brought to a potential enabling to attract the electrons. This potential depends on the distance (empty space 11) which separates the cathode/grid from the anode and is, for example, higher than 300 volts. The bands 10 are biased during a frame, for example of bands of same color, that is, for a sub-frame duration corresponding to one third of the frame period (for example, 6.6 ms). The display is performed line by line, by sequentially biasing (for example, to 80 volts) the rows L for a duration (for example 30 μs) corresponding to the duration of a sub-frame divided by the number of rows of grid 3. While a row L is biased, the columns K are brought to respective potentials between a maximum emission potential and a no-emission potential (for example, respectively 0 and 30 volts), to set the brightness of the pixels defined by the intersection of these columns and of the considered row. The biasing of the columns K changes for each new row L of the line scanning. The choice of the values of the biasing potentials is related to the characteristics of the phosphor elements 10 and of the microtips 2. Conventionally, below a voltage differential of 50 volts between cathode 1 and grid 3, there is no electronic emission, and the maximum emission corresponds to a voltage differential of 80 volts.

The microtips see their emissivity decrease as they are being used. The screens thus have a brightness which decreases with time. This decrease is significant enough not to be negligible and influences the lifetime of the screen.

SUMMARY OF THE INVENTION

The present invention aims at providing a method for regenerating the microtips which enables to give them back their original emissivity.

The present invention also aims at providing a method for controlling a microtip screen which enables to increase the lifetime of the screen.

To achieve these objects, the present invention provides a method for regenerating microtips of a flat display screen including a cathode with microtips associated with a grid for extracting electrons, comprising the step of applying, between the grid and the cathode, and for a substantially higher duration than a nominal addressing duration in operation, a substantially higher voltage differential than nominal operating voltage differentials, for causing the microtips to emit under a substantially higher current density than a nominal operating current density.

According to an embodiment of the present invention, the grid is biased at a substantially higher regeneration potential than a nominal operation potential and the cathode is biased at a nominal potential corresponding to a maximum emission.

According to an embodiment of the present invention wherein the grid is organized in rows perpendicular to columns of the cathode, the display being performed by sequentially addressing the grid rows during the nominal duration and by individually addressing the cathode columns during the nominal addressing time of a row, at least one grid row is biased at the regeneration potential and all cathode columns are biased at the maximum emission potential during a substantially higher regeneration duration than the nominal duration.

According to an embodiment of the present invention, all the rows of the grid are simultaneously biased at the regeneration potential.

According to an embodiment of the present invention, the row(s) of the grid are addressed by means of a signal including pulses of a substantially higher duration than the nominal duration, the interval between two successive pulses being substantially higher than the duration of a pulse.

According to an embodiment of the present invention, the cathode is biased at a substantially lower regeneration potential than a nominal potential corresponding to a maximum emission in operation and the grid is biased at a nominal operation potential.

The present invention also relates to a method for controlling a flat display screen including a cathode with electronic emission microtips, associated with a grid for extracting electrons emitted by the microtips and with a cathodoluminescent anode, which consists of periodically performing a regeneration cycle.

The present invention also relates to a flat display screen including a cathode with microtips, associated with a grid for extracting electrons and with a cathodoluminescent anode, including a first voltage source for biasing the grid, a second voltage source for biasing the grid, and means for selecting the first source during normal screen operation and for selecting the second source during a microtip regeneration cycle, the second source issuing a higher voltage than that issued by the first source.

BRIEF DESCRIPTION OF THE DRAWINGS

The foregoing and other objects, characteristics and advantages of the present invention will be discussed in detail in the following non-limiting description of specific embodiments of the present invention, taken in conjunction with the accompanying drawings, among which.

DETAILED DESCRIPTION

Figure 1:
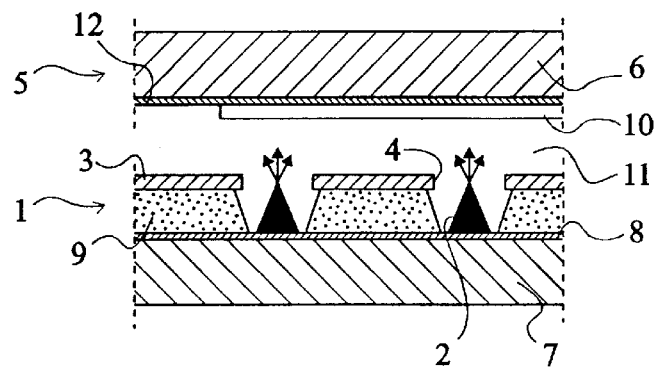
FIGS. 1 and 2, previously described, are meant to show the state of the art and the problem to solve.

For clarity, the same components have been referred to by the same references in the different drawings. For clarity still, only the components of the screen which are necessary for the understanding of the present invention have been shown in the drawings and will be described hereafter.

A feature of the present invention is to provide a specific screen control during a regeneration cycle occurring outside the display phases. This control consists of forcing the microtips to emit under a high current density, by increasing the voltage differential between the cathode and the grid, for a relatively long time with respect to the conventional image frame display duration.

Figure 2:
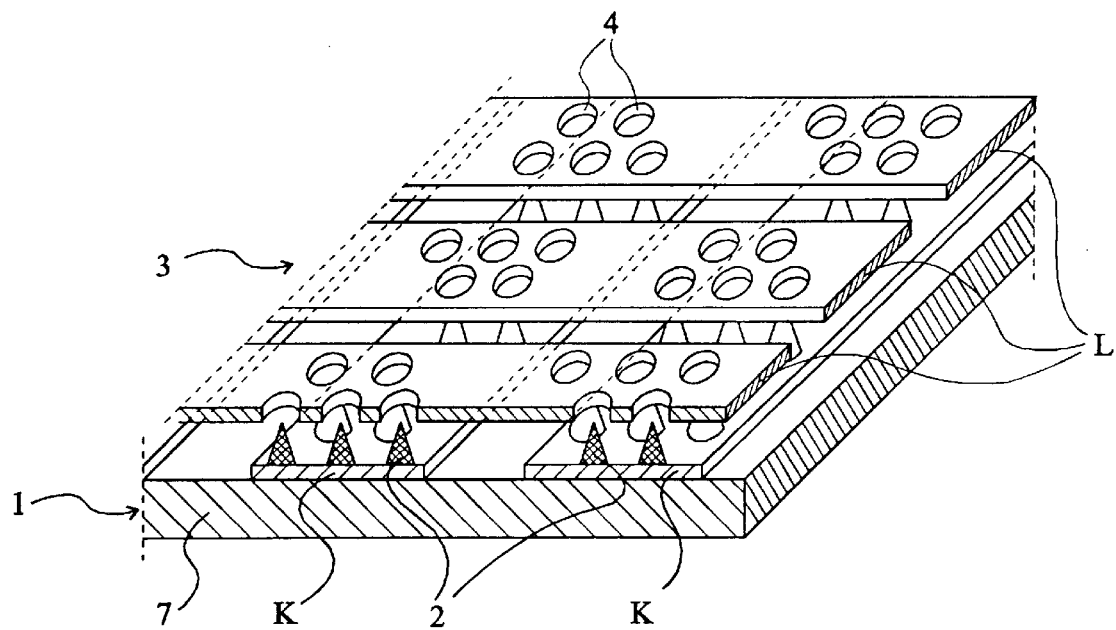

According to an embodiment of the present invention, a regeneration cycle consists of biasing the rows L of grid 3 (FIG. 2) to a regeneration potential which is substantially higher than the nominal row addressing potential. While rows L are being brought to the regeneration potential, cathode 1 is biased by simultaneously addressing all the columns K at the potential corresponding to the maximum illumination order when the screen is operating.

The increase of the biasing potential of grid 3 enables to increase the current in each tip 2. For example, for a regeneration potential of 110 volts and a nominal potential of 80 volts, the current in a tip practically increases by a factor 5 (Fowler and Nordheim Law).

To avoid that the heating up of the phosphor elements associated with the electronic emission during the regeneration damages the screen, the biasing of the grid at the regeneration potential is, preferably, performed by a pulse signal. The pulsewidth is substantially higher than the nominal duration of biasing of a grid row and the interval between two successive pulses is chosen to leave time for the screen to cool down before the occurrence of a new pulse.

For example, if the nominal duration of biasing of a grid row is about 30 $\mu s$, the rows will be biased, during regeneration, by pulses of about 500 $\mu s$ with a period of about 10 ms. The amount of electrons passing through a tip during a pulse, and thus the energy dissipated by Joule effect, is thus considerably higher than that which passes through a tip emitting during screen operation. For example, during a 500 $\mu s$ pulse and taking the increase of the biasing potential of grid 3 into account, the amount of electrons passing through a tip increases by a factor of about 80 with respect to an addressing time of 30 $\mu s$.

The duration of a regeneration cycle, that is, the duration of biasing by the pulse signal, depends on the need for regeneration. This duration ranges, for example, between 1 and 10 minutes.

It can be seen that the brightness of a previously used screen to which the method according to the present invention is applied increases and that the screen recovers a brightness corresponding to its original brightness if the regeneration is performed long enough. It is assumed that the strong heating of the microtips associated with the substantially greater energy than in normal operation, releases from the microtip surface products due to degassings, especially the phosphor elements of the anode, during screen operation.

The method according to the present invention is a restoring process which restores the emissivity of the sole microtips which require it without affecting the others.

The brightness decrease due to the loss of emissivity of the microtips depends, indeed, on their time of utilization and can be irregular on the screen surface. For example, by addressing a determined partial area of microtips for a sufficiently long time, and then by addressing all cathode columns with a given illumination order, the brightness then appears to be lower in the partial area than in the rest of the screen surface.

After applying the regeneration method according to the present invention, it may be observed by addressing the entire screen surface that the brightness is homogeneous and at the original level, which means that all microtips have recovered their original emissivity, whatever their time of use before regeneration.

During a regeneration cycle, the electrons emitted by the microtips are collected by the grid if the screen anode is not addressed. If the anode is addressed, these electrons are then collected by the anode electrodes.

The implementation of the regeneration method according to the present invention is performed by means of the conventional electronic screen control circuit.

Figure 3:
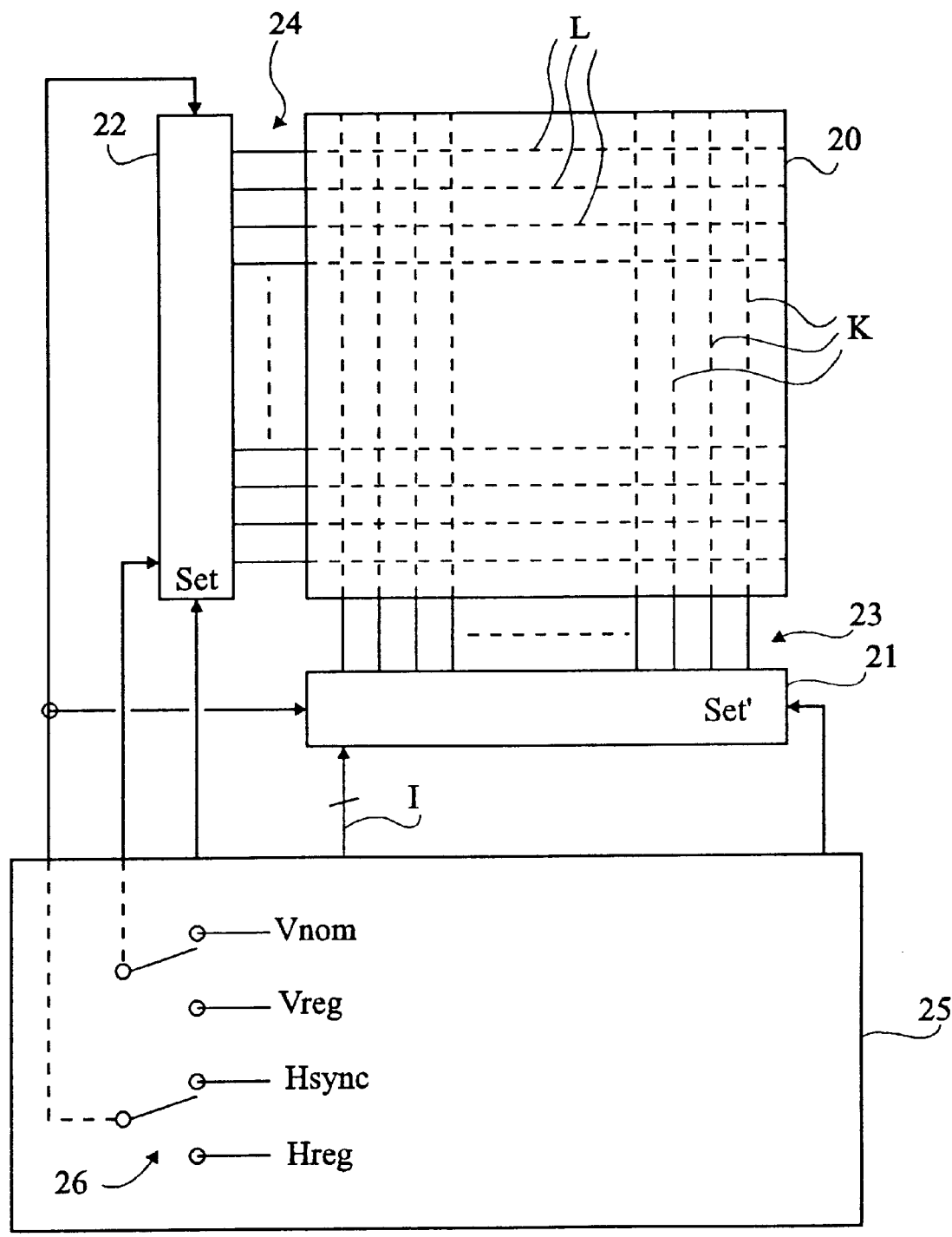
FIG. 3 schematically and partially shows an embodiment of a circuit for controlling a screen according to the present invention.

FIG. 3 shows an embodiment of a portion of such a circuit used for addressing the cathode and the grid. Each column K and each row L of screen 20 is individually connected to an output of an addressing circuit 21 or 22, associated, respectively, with cathode 1 or with grid 3. An addressing circuit generally includes as many outputs as there are rows or columns to be addressed and the outputs of circuits 21 and 22 are connected by appropriate connectors, respectively 23 and 24, to the rows L and columns K. Circuits 21 and 22 are, for example, formed of parallel output shift registers. Circuits 21 and 22 are controlled by a common block 25 also used to control the addressing of the anode (not shown). Circuit 21 receives from block 25 the individual orders I of biasing of the columns K and is meant to bias these columns at the rate of line scanning frequency Hsync. Circuit 22 is meant to shift the biasing of the grid from one row to the following at the rate of line scanning frequency Hsync and receives from circuit 25, in addition to signal Hsync, a nominal biasing voltage Vnom (for example, 80 volts).

Circuits 21 and 22 generally further include inputs, respectively Set and Set', enabling to simultaneously force all outputs to a same level.

According to the present invention, advantage is taken of the presence of this forcing input to set, during a pulse of a regeneration cycle, all the rows of grid 3 to the regeneration potential and all the columns of cathode 1 to the nominal maximum emission potential. Thus, the implementation of the present invention does not require modifications of conventional addressing circuits. It is enough to modify control block 25 so that it issues, during regeneration cycles, a specific clock signal Hreg enabling to respect the desired control pulse and a regeneration potential Vreg, for example 110 volts. Block 25 includes switching means 26 enabling to select either signal Hsync and potential Vnom, or signal Hreg and potential Vreg.

The regeneration of the microtips can also be performed row by row, while respecting a line scanning. Similarly, a regeneration by groups of screen pixels can be performed by only addressing a given number of rows and columns.

An advantage of the present invention is that it enables the implementation of a regeneration of the microtips with no other intervention than a specific screen control cycle.

Thus, it can be provided that the user operates a specific control knob (not shown) starting a regeneration cycle when he notes that the brightness of the screen decreases.

An automatic periodical regeneration may also be provided, outside screen operation (for example, upon turning-on of the screen), directly caused by the screen control circuit after a predetermined operation time.

The duration of a regeneration cycle (for example, from 1 to 10 minutes) is, preferably, set to be long enough to obtain a full regeneration according to the frequency of the regeneration cycles. It should however be noted that a duration, higher than the time strictly necessary for the full regeneration, is not disturbing since once they have recovered their original emissivity, the microtips are not affected by the regeneration.

Of course, the present invention is likely to have various alterations, modifications, and improvements which will readily occur to those skilled in the art. In particular, although reference has been made in the foregoing description to an increase of the grid potential, the minimum addressing potential of the cathode column, or both potentials, can be modified. It should also be noted that the present invention also applies to the case where the illumination order of a pixel is set by modulation of the pulse width of the signals for addressing the cathode column.

Further, the practical implementation of the modifications to be brought to the control circuit for implementing the present invention is within the abilities of those skilled in the art based on the functional indications given hereabove. Moreover, the present invention applies to a color screen as well as to a monochrome screen.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

What is claimed is:

1. A method for regenerating microtips of a flat display screen including a cathode with microtips associated with a grid for extracting electrons, comprising the step of: applying between the grid and the cathode, and for a duration substantially higher than a nominal addressing duration in operation, a substantially higher voltage differential than nominal operating voltage differentials, for causing the microtips to emit under a substantially higher current density than a nominal operating current density.

2. A regeneration method according to claim 1, comprising the steps of:
    biasing the grid at a substantially higher regeneration potential than a nominal operation potential; and
    biasing the cathode at a nominal potential corresponding to a maximum emission.

3. A regeneration method according to claim 1 wherein the grid is organized in rows perpendicular to columns of the cathode, and the display being performed, comprising the steps of:
    addressing sequentially the grid rows during the nominal duration;
    addressing individually the cathode columns during the nominal addressing time of a row;
    biasing at least one grid row at the regeneration potential; and
    biasing all cathode columns at the maximum emission potential during a substantially higher regeneration duration than the nominal duration.

4. A regeneration method according to claim 1, comprising the step of: biasing simultaneously all the rows of the grid at the regeneration potential.

5. A regeneration method according to claim 3 comprising the step of addressing at least one row of the grid by means of a signal including pulses of a substantially higher duration than the nominal duration, an interval between two successive pulses being substantially higher than the duration of a pulse.

6. A regeneration method according to claim 1, comprising the steps of:
    biasing the cathode at a substantially lower regeneration potential than a nominal potential corresponding to a maximum emission in operation; and
    biasing the grid at a nominal operation potential.

7. A method for controlling a flat display screen including a cathode with electronic emission microtips, associated with a grid for extracting electrons emitted by the microtips and with a cathodoluminescent anode comprising the step of: applying between the grid and the cathode, for a duration substantially higher than a nominal addressing duration in operation, a substantially higher voltage differential than nominal operating voltage differentials, for causing the microtips to emit under a substantially higher current density than a nominal operating current density.

8. A control method according to claim 7, comprising the step of periodically performing a regeneration cycle.

9. A flat display screen including a cathode with microtips associated with a grid for extracting electrons and with a cathodoluminescent anode comprising:
    a first voltage source for biasing the grid;
    a second voltage source for biasing the grid; and
    means for selecting the first source during normal screen operation and for selecting the second source during a regeneration cycle of the microtips the second source issuing a higher voltage than that issued by the first source.

* * * * *